(12) United States Patent
Shen et al.

(10) Patent No.: US 10,819,894 B2
(45) Date of Patent: Oct. 27, 2020

(54) HUMAN MACHINE INTERFACE SYSTEM AND METHOD OF PROVIDING GUIDANCE AND INSTRUCTION FOR IRIS RECOGNITION ON MOBILE TERMINAL

(71) Applicant: SUZHOU SIYUAN KEAN INFORMATION TECHNOLOGY CO., LTD, Suzhou, Jiangsu (CN)

(72) Inventors: Hongquan Shen, Jiangsu (CN); Weimin Ni, Jiangsu (CN)

(73) Assignee: SUZHOU SIYUAN KEAN INFORMATION TECHNOLOGY CO., LTD, Suzhou, Jiangsu (CN)

(*) Notice: Subject to any disclaimer, the term of this patent is extended or adjusted under 35 U.S.C. 154(b) by 214 days.

(21) Appl. No.: 16/314,097

(22) PCT Filed: Apr. 24, 2017

(86) PCT No.: PCT/CN2017/081690
§ 371 (c)(1),
(2) Date: Dec. 28, 2018

(87) PCT Pub. No.: WO2017/182004
PCT Pub. Date: Oct. 26, 2017

(65) Prior Publication Data
US 2019/0230266 A1    Jul. 25, 2019

(30) Foreign Application Priority Data

Apr. 22, 2016  (CN) .......................... 2016 1 0260196
Nov. 4, 2016   (CN) .......................... 2016 1 0965134

(51) Int. Cl.
*H04N 5/225*   (2006.01)
*G06K 9/00*    (2006.01)
(Continued)

(52) U.S. Cl.
CPC ............ *H04N 5/2259* (2013.01); *G06K 9/00* (2013.01); *G06K 9/00221* (2013.01); *G06K 9/32* (2013.01); *H04N 5/2258* (2013.01); *H04N 5/33* (2013.01)

(58) Field of Classification Search
CPC ...... H04N 5/2259; H04N 5/2258; H04N 5/33; G06K 9/00; G06K 9/00221; G06K 9/32
See application file for complete search history.

(56) References Cited

U.S. PATENT DOCUMENTS

2017/0061210 A1*  3/2017  Ollila ................. H04N 1/00307

FOREIGN PATENT DOCUMENTS

| CN | 104199553 A | 12/2014 |
| CN | 104394311 A | 3/2015 |

(Continued)

OTHER PUBLICATIONS

International Search Report of PCT/CN2017/081690, dated Jul. 28, 2017.

*Primary Examiner* — Twyler L Haskins
*Assistant Examiner* — Fayez Bhuiyan
(74) *Attorney, Agent, or Firm* — Locke Lord LLP; Tim Tingkang Xia, Esq.

(57) ABSTRACT

A human machine interface system (100) and method of providing guidance and instruction for iris recognition on a mobile terminal. The system comprises: a near infrared imaging module (101), a visible light imaging module (102), and a display screen (103). The visible light imaging module (102) has an optical image acquisition area covering that of the near infrared imaging module (101). The display screen (103) displays a visible light image produced by preconfigured pixel adjustment. The preconfigured pixel adjustment (Continued)

comprises acquiring the invisible light image by performing a relative image center pixel shift process and/or a local area ROI pixel selection process.

28 Claims, 2 Drawing Sheets

(51) Int. Cl.
*G06K 9/32* (2006.01)
*H04N 5/33* (2006.01)

(56) References Cited

FOREIGN PATENT DOCUMENTS

| | | |
|---|---|---|
| CN | 105303155 A | 2/2016 |
| CN | 105357426 A | 2/2016 |
| CN | 105956528 A | 9/2016 |

* cited by examiner

FIG. 1

FIG. 2

HUMAN MACHINE INTERFACE SYSTEM AND METHOD OF PROVIDING GUIDANCE AND INSTRUCTION FOR IRIS RECOGNITION ON MOBILE TERMINAL

FIELD

The present invention relates to the field of biometric opto-mechatronics, and in particular, to a human-machine interface system and method for guiding and indicating iris identification of a mobile terminal.

BACKGROUND

Mobile terminals include smartphones, tablets, wearable devices, etc. In the current trend of information technology mobilization development, mobile terminal devices are inevitably the most widely used devices in the future.

At present, mobile terminals in practical applications have been widely used in mobile secure payment, account secure login, and online banking, such as in Yu'E Bao (APP), WeChat (APP), and Credit Card Management (APP). Although the mobile terminal has brought great convenience to life in its use, a new type of economic crime caused by the poor security performance of mobile terminal has gradually emerged.

Moreover, in the mobile terminal, the common means for identity verification in the prior art is inputting a password, but the means for identity verification is very low in security, and the password would be divulged only by implanting a simple virus program on the mobile terminal, thereby causing corresponding losses. In order to solve this problem, the biometric identification method is still used for security identity authentication of mobile terminals internationally; for example, the fingerprint identification technology developed by the Apple Inc. based on the AuthenTec Company, which is applied to mobile phone terminals, greatly improving the identity verification security of the mobile terminal. However, in the process of fingerprint identification, since the fingerprint is static, although unique, it is extremely easy to obtain fingerprint information, even being copied, etc., with the wider use of fingerprint technology on mobile terminals, the security thereof will also decline, accordingly. Therefore, iris identification, which is more advantageous in terms of security, is a very effective method to solve the security identity authentication process of mobile terminals, and the iris identification system is the safest way of safe living body security feature in the existing biometric identification.

In the current prior art, the human-machine interface system for guiding and indicating collects iris images and displays same in a display screen to guide users to adjust the front, back, up, down, left, and right positions. However, since the collected iris images are monochrome images, and near-infrared LEDs reflect large white areas on the skin, and the iris per se has low contrast brightness, the images finally used for display are very unattractive to the user, thereby affecting the user's psychological use feeling, and furthermore, it also affects the user experience and ease of use.

Therefore, it needs to implement a human-machine interface system for guiding and indicating iris identification of a mobile terminal, which has a guiding and indicating human-machine interface with high user experience and ease of use, beautiful appearance, and high user psychological compliance.

SUMMARY

The present invention provides a human-machine interface system for guiding and indicating iris identification of a mobile terminal, including: a near-infrared imaging module, a visible light imaging module, and a display screen, where an optical image acquisition area of the visible light imaging module covers an optical image acquisition area of the near-infrared imaging module; and the display screen displays a visible light image subjected to predetermined pixel adjustment, the image subjected to the predetermined pixel adjustment being a visible light image obtained by the center position pixel offset and/or local area ROI pixel selection processing of a relative imaging image.

Preferably, the center position pixel offset processing of the relative imaging image specifically includes: a center position pixel of a relative imaging image displayed in the display screen is subjected to X-Y coordinate axis shift pixel offset adjustment, the offset adjustment being determined according to the predetermined physical optical mapping of the center of the visible light imaging module relative to the center of the near-infrared imaging module and/or the center of the display area of the display screen.

Preferably, the local area ROI pixel selection processing of the relative imaging image specifically includes: selective adjustment of a local area ROI pixel of the relative imaging image displayed in the display screen is determined according to the physical optional mapping of the visible light imaging module relative to the near-infrared imaging module and/or the center of the display area of the display screen.

A human-machine interface method for guiding and indicating iris identification of a mobile terminal is provided according to another aspect of the present invention. The mobile terminal includes a near-infrared imaging module and a visible light imaging module, where an optical image acquisition area of the visible light imaging module covers an optical image acquisition area of the near-infrared imaging module. The method includes the following steps:

a) acquiring and physically imaging and outputting a near-infrared iris image;

b) acquiring and physically imaging and outputting a visible light image; and c) displaying the visible light image submitted to predetermined pixel adjustment, the predetermined pixel adjustment being the center position pixel offset and/or local area ROI pixel selection processing of a relative imaging image.

The greatest advantage of the system configuration and method employed by the present invention is that although the change in the imaging object distance of an iris identification near-infrared imaging module in the depth of field range would cause change in the imaging image range, the visible light iris image subjected to the predetermined pixel adjustment acquired and displayed by the visible light imaging module has the same change in image range, so as to maintain the image range during the display guidance and the imaging image range of the actual iris identification near-infrared imaging module to be consistent, avoiding errors in guiding and indicating the image caused by inconsistency.

Furthermore, the present invention overcomes the errors in guiding and indicating the viewing angle and the gaze field of view of the eyes of a user when in use caused by inconsistency in physical positions of the center of the visible light imaging module relative to the center of the near-infrared imaging module or the center of the display area of the display screen.

The display screen is used for displaying text image information indicating that the user uses a suitable range such as a distance, and up, down, left and right positions, and uses state information such as a specular reflection position adjustment when wearing glasses, and indicating that the identification is successful or fails, etc.

In conclusion, the present invention implements the effect of a human-machine interface for guiding and indicating iris identification of a mobile terminal.

When used by the user, the iris identification of the mobile terminal provides effective human-machine interface guidance and indication to improve the identification speed and the identification rate and further improve the user experience and ease of use. Moreover, the visible light iris image subjected to the predetermined pixel adjustment acquired and displayed by the visible light imaging module has the same change in image range, to maintain the image range during the display guidance and the imaging image range of the actual iris identification near-infrared imaging module to be consistent, avoiding errors in guiding and indicating the image caused by inconsistency.

Furthermore, the present invention adopts the predetermined physical optical mapping transform of the center of the visible light imaging module relative to the center of the near-infrared imaging module or the center of the display area of the display screen to overcome the errors in guiding and indicating the viewing angle and the gaze field of view of the eyes of a user when in use caused by inconsistency in physical positions of the center of the visible light imaging module relative to the center of the near-infrared imaging module or the center of the display area of the display screen.

DETAILED DESCRIPTION

The present invention specifically implements a human-machine interface system for guiding and indicating iris identification of a mobile terminal, which has a guiding and indicating human-machine interface with high user experience and ease of use, beautiful appearance, and high user psychological compliance.

Embodiment 1

Figure 1:
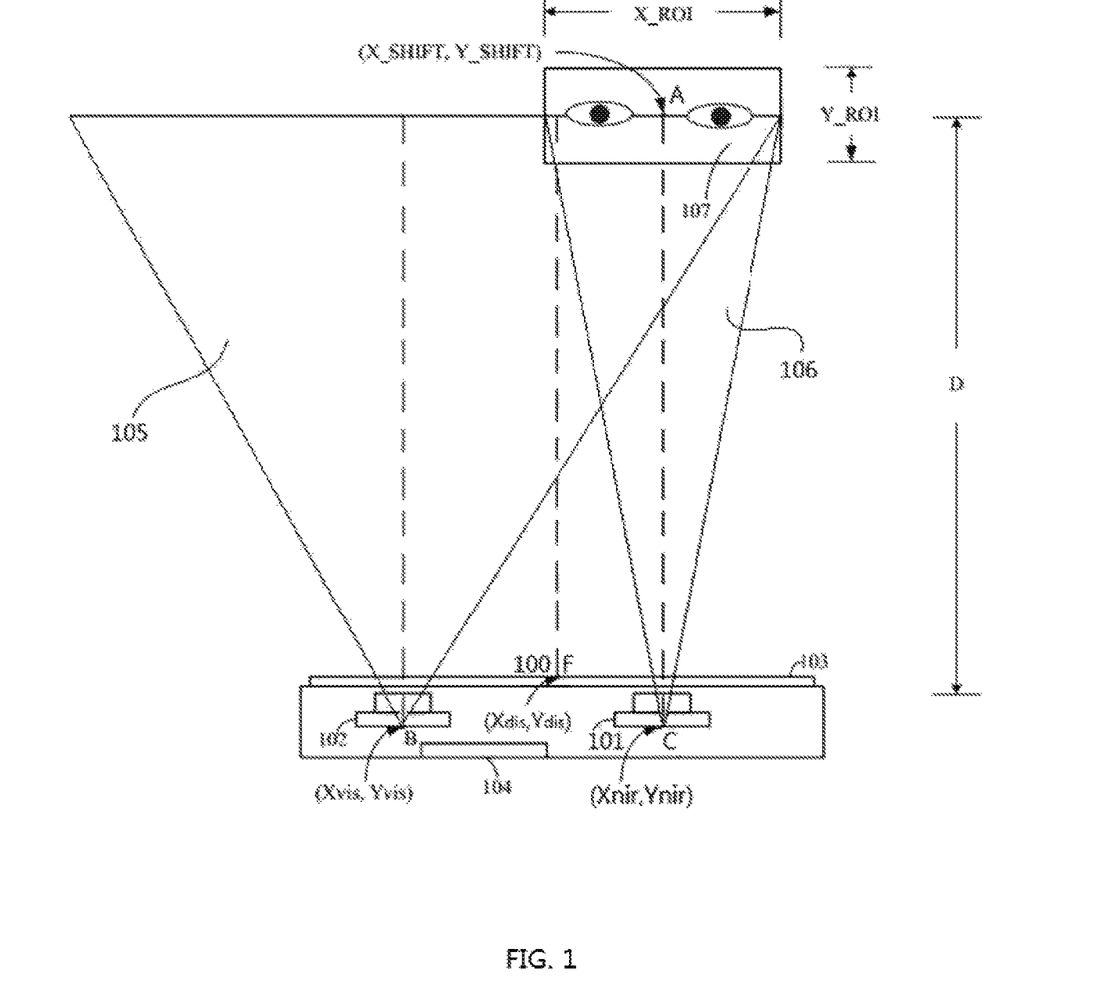
FIG. 1 is a schematic diagram of the physical optical mapping principle of the center of a visible light imaging module relative to the center of a near-infrared imaging module according to a human-machine interface system of the present invention.

As shown in FIG. 1, the human-machine interface system 100 for guiding and indicating iris identification of a mobile terminal according to the present invention includes: an iris identification near-infrared imaging module 101, a visible light imaging module 102, a display screen 103, and a processor 104, where the iris identification near-infrared imaging module 101, the visible light imaging module 102, and the processor 104 are built in a mobile terminal; the visible light imaging module 102 is used for obtaining a visible light image of a face background; and the near-infrared imaging module 101 is used for obtaining a near-infrared iris image of human eyes. By means of the design method of the present invention, the display screen 103 can display the visible light image. According to a preferred embodiment of the present invention, the visible light image displayed in the display screen 103 may also contain iris information.

As shown in FIG. 1, the iris identification near-infrared imaging module 101 at least includes: a near-infrared optical imaging lens, a near-infrared optical band-pass filter, and a near-infrared image imaging sensor for physically imaging and outputting a near-infrared iris image.

The visible imaging module 102 at least includes: a visible light optical imaging lens, a visible light optical band-pass filter, and a visible light image imaging sensor for physically imaging and outputting a visible light iris image.

An optical image acquisition area 105 of the visible light imaging module 102 covers an optical image acquisition area 106 of the iris identification near-infrared imaging module 101, so as to use the acquired iris image information to display the visible light image including the iris information. According to an embodiment of the present invention, preferably, the optical image acquisition area 105 of the visible light imaging module 102 may be larger than the optical image acquisition area 106 of the iris identification near-infrared imaging module 101.

According to an embodiment of the present invention, preferably, parameters of the iris identification near-infrared imaging module 101 and the visible light imaging module 102 are combined and configured as:

The EFLnir equivalent focal length of a near-infrared optical imaging lens of the iris identification near-infrared imaging module 101 is larger than the EFLvis equivalent focal length of a visible light optical imaging lens of the visible light imaging module 102.

According to another embodiment of the present invention, a product PSnir*PXnir of a unit pixel physical size PSnir of a near-infrared image imaging sensor of the iris identification near-infrared imaging module 101 and the number of pixels PXnir in the X-axis horizontal direction is less than a product PSnir*PXnir of a unit pixel physical size PSvis of an image imaging sensor of the visible light imaging module 102 and the number of pixels PXvis in the horizontal direction, i.e., PSnir*PXnir<PSvis*PXvis.

According to another embodiment of the present invention, a product PSnir*PYnir of a unit pixel physical size PSnir of an image imaging sensor of the iris identification near-infrared imaging module 101 and the number of pixels PYnir in the Y-axis vertical direction is less than a product PSvis*PYvis of a unit pixel physical size PSvis of an image imaging sensor of the visible light imaging module 102 and the number of pixels PYvis in the vertical direction, i.e., PSnir*PYnir<PSvis*PYvis.

The human-machine interface for guiding and indicating is configured as: the visible light imaging module acquires and displays the visible light iris image subjected to predetermined pixel adjustment.

The processor 104 is connected to the iris identification near-infrared imaging module 101, the visible light imaging module 102, and the display screen 103 for respectively acquiring and processing the near-infrared iris image and the visible light image, and feeding back and controlling the display screen 103 for the guiding and indicating human-machine interface to display the visible light image.

Acquiring the near-infrared iris image is further used for the processor to perform iris identification, and acquiring the visible light image is further used for the processor to perform feedback control on the display screen to display the visible light image.

Where:

the display screen 103 displays the visible light image subjected to predetermined pixel adjustment, the image subjected to the predetermined pixel adjustment being a visible light image obtained by the center position pixel offset and local area ROI pixel selection processing of a relative imaging image.

According to an embodiment of the present invention, the display screen 103 is further used for displaying text image information indicating that the user uses a suitable range such as a distance, and up, down, left and right positions, and uses state information such as a specular reflection position adjustment when wearing glasses, and indicating that the identification is successful or fails, etc.

The present invention adopts the predetermined physical optical mapping transform of the center of the visible light imaging module relative to the center of the near-infrared imaging module and/or the center of the display area of the display screen to overcome the errors in guiding and indicating the viewing angle and the gaze field of view of the eyes of a user when in use caused by inconsistency in physical positions of the center of the visible light imaging module relative to the center of the near-infrared imaging module or the center of the display area of the display screen.

According to an embodiment of the present invention, the center position pixel offset processing of the relative imaging image specifically includes: a center position pixel of a relative imaging image displayed in the display screen 103 is subjected to X-Y coordinate axis shift pixel offset adjustment (X_SHIFT, Y_SHIFT), the offset adjustment (X_SHIFT, Y_SHIFT) being determined according to the physical optical mapping of the center of the visible light imaging module relative to the center of the near-infrared imaging module.

Specifically, according to an embodiment of the present invention, with reference to FIG. 1, the center position pixel offset processing of the relative imaging image specifically includes:

a center position pixel of a relative imaging image displayed in the display screen 103 is subjected to X-Y coordinate axis shift pixel offset adjustment (X_SHIFT, Y_SHIFT), such as point A in FIG. 1, point A is the adjusted central position. The offset adjustment (X_SHIFT, Y_SHIFT) is determined according to the physical optical mapping of the center of the visible light imaging module 102 relative to the center of the near-infrared imaging module 101.

The offset adjustment of X-Y axis shift (X_SHIFT, Y_SHIFT) is calculated as follows:

$X\_SHIFT = \beta vis*(Xnir-Xvis)/PSvis$ $Y\_SHIFT = \beta vis*(Ynir-Yvis)/PSvis$ $\beta vis = EFLvis/(D-EFLvis)$ where:

(X_SHIFT, Y_SHIFT) are X and Y coordinate axis shifts of the center of the relative imaging image displayed in the display screen respectively, the unit is pixel;

(Xnir, Ynir) are physical positions of the X and Y coordinate axes of the optical center of the iris identification near-infrared imaging module 101 respectively, such as point C in FIG. 1, the unit is cm;

(Xvis, Yvis) are physical positions of the X and Y coordinate axes of the optical center of the visible light imaging module 102 respectively, such as point B in FIG. 1, the unit is cm;

The ranges of the physical positions of the X and Y coordinate axes of the optical centers of the iris identification near-infrared imaging module 101 and the visible light imaging module 102 are as close as possible to optimize the effect.

$\beta vis$ is the optical amplification factor of the visible light imaging module 102, no unit;

EFLvis is the equivalent focal length of the optical imaging lens of the visible light imaging module, the unit is mm;

D is the optical imaging object distance, the unit is cm; and

PSvis is the unit pixel physical size of the image imaging sensor of the visible light imaging module, the unit is μm/pixel.

For example, taking an actual mobile application as an example, the specific parameters are as follows:

EFLvis=2 mm, $D$=30 cm, PSvis=1.12 μm/pixel, (Xnir−Xvis)=3 cm;

(Ynir−Yvis)=1 cm;

$\beta vis$=0.00675; and (X_SHIFT,Y_SHIFT)=(180 pixels, 60 pixels), i.e., the center position pixels of the relative imaging image displayed in the display screen are adjusted as 180 pixels and 60 pixels by the X-Y coordinate axis shift pixel offset.

Figure 2:
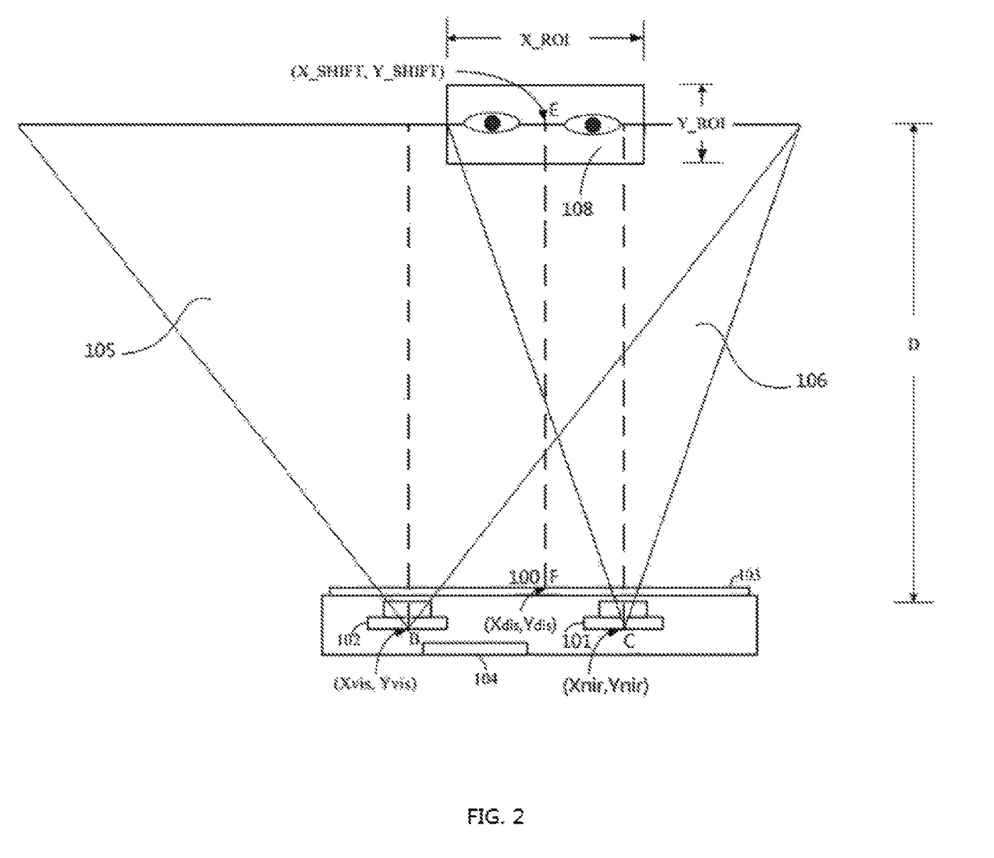
FIG. 2 is a schematic diagram of the physical optical mapping principle of the center of the visible light imaging module relative to the center of a display area of a display screen according to the human-machine interface system of the present invention.

According to an embodiment of the present invention, the center position pixel offset processing of the relative imaging image specifically includes: a center position pixel of a relative imaging image displayed in the display screen 103 is subjected to X-Y coordinate axis shift pixel offset adjustment (X_SHIFT, Y_SHIFT), the offset adjustment (X_SHIFT, Y_SHIFT) being determined according to the physical optical mapping of the center of the visible light imaging module 102 relative to the center of the display area 100 of the display screen.

Specifically, according to an embodiment of the present invention, with reference to FIG. 2, the center position pixel offset processing of the relative imaging image specifically includes:

a center position pixel of a relative imaging image displayed in the display screen 103 is subjected to X-Y coordinate axis shift pixel offset adjustment (X_SHIFT, Y_SHIFT), such as point E in FIG. 1, point E is the adjusted central position. The offset adjustment (X_SHIFT, Y_SHIFT) is determined according to the physical optical mapping of the center of the visible light imaging module 102 relative to the center of the display area 100 of the display screen.

The offset adjustment of X-Y axis shift (X_SHIFT, Y_SHIFT) is calculated as follows:

$X\_SHIFT = \beta vis*(Xdis-Xvis)/PSvis$ $Y\_SHIFT = \beta vis*(Ydis-Yvis)/PSvis$ $\beta vis = EFLvis/(D-EFLvis)$ where:

(X_SHIFT, Y_SHIFT) are X and Y coordinate axis shifts of the center of the relative imaging image displayed in the display screen respectively, the unit is pixel;

(Xdis, Ydis) are physical positions of the X and Y coordinate axes of the optical center of the display area 100 of the display screen respectively, such as point F in FIG. 1, the unit is cm;

(Xvis, Yvis) are physical positions of the X and Y coordinate axes of the optical center of the visible light imaging module 102 respectively, such as point B in FIG. 1, the unit is cm;

where the ranges of the physical positions of the X and Y coordinate axes of the optical centers of the display area 100 of the display screen and the visible light imaging module 102 are as close as possible to optimize the effect.

$\beta$vis is the optical amplification factor of the visible light imaging module 102, no unit;

EFLvis is the equivalent focal length of the optical imaging lens of the visible light imaging module, the unit is mm;

D is the optical imaging object distance, the unit is cm; and

PSvis is the unit pixel physical size of the image imaging sensor of the visible light imaging module, the unit is μm/pixel.

For example, taking an actual mobile application as an example, the specific parameters are as follows:

EFLvis=2 mm, D=30 cm, PSvis=1.12 μm/pixel, (Xdis−Xvis)=2 cm;

(Ydis−Yvis)=2 cm;

βvis=0.00675; and (X_SHIFT,Y_SHIFT)=(120 pixels, 120 pixels), i.e., the center position pixels of the relative imaging image displayed in the display screen are adjusted as 120 pixels and 120 pixels by the X-Y coordinate axis shift pixel offset.

It should be particularly emphasized in the present invention that in the above-mentioned embodiments, the center of the display area 100 of the display screen is defined as the center of a local area of the display screen for the guiding and indicating human-machine interface to display the visible light iris image, which is a partial local area of the entire display screen, such as only ⅓ local area at the upper part of the display screen.

It should be particularly emphasized in the present invention that in the above-mentioned embodiments, the center position pixel of the relative imaging image displayed in the display screen 103 is subjected to X-Y coordinate axis shift pixel offset adjustment (X_SHIFT, Y_SHIFT); the physical optical mapping of the center of the visible light imaging module 102 relative to the center of the display area 100 of the display screen is mathematically equivalent to a combined transform of the physical optical mapping of the center of the visible light imaging module 102 relative to the center of the near-infrared imaging module 101 and the physical optical mapping of the center of the near-infrared imaging module 101 relative to the center of the display area 100 of the display screen.

That is, (Xdis−Xvis)=(Xnir−Xvis)−(Xnir−Xdis); and (Ydis−Yvis)=(Ynir−Yvis)−(Ynir−Ydis).

According to an embodiment of the present invention, the local area ROI pixel selection processing of the relative imaging image specifically includes:

Pixel selective adjustment (X_ROI, Y_ROI) of local area ROIs 107 and 108 of the relative imaging image displayed in the display screen 103 is determined according to the physical optical mapping of the visible light imaging module 102 relative to the center of the near-infrared imaging module 101 and/or the center of the display area 100 of the display screen. Through the physical optical mapping of the visible light imaging module 102 relative to the near-infrared imaging module 101 and/or the center of the display area 100 of the display screen, the visible light iris image subjected to the predetermined pixel adjustment acquired and displayed by the visible light imaging module has the same change in image range, to maintain the image range during the display guidance and the imaging image range of the actual iris identification near-infrared imaging module to be consistent, avoiding errors in guiding and indicating the image caused by inconsistency.

Specifically, according to an embodiment of the present invention, with reference to FIG. 1, the pixel selective adjustment (X_ROI, Y_ROI) of the local area ROI 107 of the relative imaging image displayed in the display screen 103 is determined according to the physical optical mapping of the visible light imaging module 102 relative to the center of the near-infrared imaging module 101. The method for calculating the selected local area quantity (X_ROI, Y_ROI) includes the following steps:

X_ROI=βvis*PSnir*PXnir/(βnir*PSvis)

Y_ROI=βvis*PSnir* PYnir/(βnir*PSvis)

βvis=EFLvis/(D−EFLvis)

βnir=EFLnir/(D−EFLnir)

where:

(X_ROI, Y_ROI) are local area ROIs 107 of the relative imaging image displayed in the display screen respectively, the unit is pixel;

PXnir and Pynir are the number of pixels in the X-axis horizontal direction and the number of pixels in the Y-axis vertical direction of the iris identification near-infrared imaging module respectively, the unit is pixel;

βnir is the optical amplification factor of the iris identification near-infrared imaging module, no unit;

βvis is the optical amplification factor of the visible light imaging module, no unit;

EFLnir is the equivalent focal length of the optical imaging lens of the iris identification near-infrared imaging module, the unit is mm;

EFLvis is the equivalent focal length of the optical imaging lens of the visible light imaging module, the unit is mm;

D is the imaging object distance, the unit is cm;

PSnir is the unit pixel physical size of the image imaging sensor of the iris identification near-infrared imaging module, the unit is μm/pixel; and PSvis is the unit pixel physical size of the image imaging sensor of the visible light imaging module, the unit is μm/pixel.

Taking an actual mobile application as an example, the specific parameters are as follows:

EFLvis=2 mm, EFLnir=4 mm, D=30 cm,
    PXnir=1920 pixels, PYnir=1080 pixels,
    PSnir=PSvis=1.12 μm/pixels;

βnir=0.0135;

βvis=0.0067; and (X_ROI,Y_ROI)=(960 pixels, 540 pixels), i.e., the pixels of the local area ROI of the relative imaging image displayed in the display screen are selectively adjusted as 960 pixels and 540 pixels.

Specifically, according to an embodiment of the present invention, with reference to FIG. 2, the pixel selective adjustment (X_ROI, Y_ROI) of the local area ROI 108 of the relative imaging image displayed in the display screen 103 is determined according to the physical optical mapping of the visible light imaging module 102 relative to the center of the display area 100 of the display screen. The method for calculating the selected local area quantity (X_ROI, Y_ROI) includes the following steps:

$$X\_ROI = \beta vis/PSvis * [(PSnir * PXnir/\beta nir) - abs(Xnir - Xdis)]$$

$$Y\_ROI = \beta vis/PSvis * [PSnir * PYnir/\beta nir) - abs(Ynir - Ydis)]$$

$$\beta vis = EFLvis/(D - EFLvis)$$

$$\beta nir = EFLnir/(D - EFLnir)$$

where:

(X_ROI, Y_ROI) are local area ROIs 108 of the relative imaging image displayed in the display screen respectively, the unit is pixel;

PXnir and Pynir are the number of pixels in the X-axis horizontal direction and the number of pixels in the Y-axis vertical direction of the iris identification near-infrared imaging module respectively, the unit is pixel;

βnir is the optical amplification factor of the iris identification near-infrared imaging module, no unit;

βvis is the optical amplification factor of the visible light imaging module, no unit;

EFLnir is the equivalent focal length of the optical imaging lens of the iris identification near-infrared imaging module, the unit is mm;

EFLvis is the equivalent focal length of the optical imaging lens of the visible light imaging module, the unit is mm;

D is the imaging object distance, the unit is cm;

PSnir is the unit pixel physical size of the image imaging sensor of the iris identification near-infrared imaging module, the unit is μm/pixel;

PSvis is the unit pixel physical size of the image imaging sensor of the visible light imaging module, the unit is μm/pixel;

(Xnir, Ynir) are physical positions of the X and Y coordinate axes of the optical center of the iris identification near-infrared imaging module 101 respectively, such as point C in FIG. 1, the unit is cm;

(Xdis, Ydis) are physical positions of the X and Y coordinate axes of the optical center of the display area 100 of the display screen respectively, such as point F in FIG. 1, the unit is cm; and abs( ) is an absolute value function for representing mathematical absolute value calculation.

Taking an actual mobile application as an example, the specific parameters are as follows:

EFLvis=2 mm, EFLnir=4 mm, D=30 cm,
PXnir=1920 pixels, PYnir=1080 pixels,
PSnir=PSvis=1.12 μm/pixels;

abs(Xnir−Xdis)=1 cm;

abs(Ynir−Ydis)=1 cm;

βnir=0.0135;

βvis=0.0067; and (X_ROI,Y_ROI)=(900 pixels, 480 pixels), i.e., the pixels of the local area ROI of the relative imaging image displayed in the display screen are selectively adjusted as 900 pixels and 480 pixels.

It should be particularly emphasized in the present invention that in the above-mentioned embodiments, the pixels of the local area ROI of the relative imaging image displayed in the display screen 103 are selectively adjusted as (X_ROI, Y_ROI); the physical optical mapping of the visible light imaging module 102 relative to the center of the display area 100 of the display screen is mathematically equivalent to a combined transform of the physical optical mapping of the visible light imaging module 102 relative to the near-infrared imaging module 101 and the physical optical mapping of the near-infrared imaging module 101 relative to the center of the display area 100 of the display screen.

That is, abs(Xnir−Xdis)=abs[(Xnir−Xvis)−(Xdis−Xvis)]; and abs(Ynir−Ydis)=abs[(Ynir−Yvis)−(Ydis−Yvis)].

It should be particularly emphasized in the present invention that in the above-mentioned embodiments, the physical optical mapping of the visible light imaging module 102 relative to the near-infrared imaging module 101 determines that the local area ROI 107 of the relative imaging image displayed in the display screen 103 is maximized. The physical optical mapping of the visible light imaging module 102 relative to the center of the display area 100 of the display screen takes the shift offset, edge effect, invalid border and so on of the center of the display area 100 of the display screen into account, the local area ROI 108 of the actual relative imaging image should be less than or equal to the local area 107.

A human-machine interface method for guiding and indicating iris identification of a mobile terminal is provided according to another aspect of the present invention. The human-machine interface method utilizes the human-machine interface system for guiding and indicating iris identification of a mobile terminal according to Embodiment 1 of the present invention, specifically, the mobile terminal includes an iris identification near-infrared imaging module, a visible light imaging module, a display screen, and a processor. The method includes the following steps:

a) acquiring and physically imaging and outputting a near-infrared iris image for further processing;

specifically, the near-infrared iris image is physically imaged and output by using the iris identification near-infrared imaging module at least including a near-infrared optical imaging lens, a near-infrared optical band-pass filter, and a near-infrared image imaging sensor, and then is output to the processor for further processing;

b) acquiring and physically imaging and outputting a visible light iris image for further processing;

specifically, the visible light iris image is physically imaged and output by using the visible light imaging module at least including a visible light optical imaging lens, a visible light optical band-pass filter, and a visible light image imaging sensor, and then is output to the processor for further processing; and an optical image acquisition area of the visible light imaging module covers an optical image acquisition area of the iris identification near-infrared imaging module; and c) displaying the visible light iris image subjected to predetermined pixel adjustment by the display screen, the predetermined pixel adjustment being predetermined physical optical mapping transform of the center of the visible light imaging module relative to the center of the near-infrared imaging module or the center of the display area of the display screen.

The predetermined pixel adjustment is the predetermined physical optical mapping transform of the center of the visible light imaging module relative to the center of the near-infrared imaging module or the center of the display area of the display screen, including a visible light image obtained by the center position pixel offset and local area ROI pixel selection processing of the relative imaging image.

Specifically, the pixel adjustment method in the above-mentioned embodiments can be adopted to display the visible light iris image subjected to the predetermined pixel adjustment.

The greatest advantage of the system configuration and method employed by the present invention is that when used by the user, the iris identification of the mobile terminal provides effective human-machine interface guidance and indication to improve the identification speed and the identification rate and further improve the user experience and ease of use. Although the change in the imaging object distance of the iris identification near-infrared imaging module in the depth of field range would cause change in the imaging image range, the visible light iris image subjected to the predetermined pixel adjustment acquired and displayed by the visible light imaging module has the same change in image range, so as to maintain the image range during the display guidance and the imaging image range of the actual iris identification near-infrared imaging module to be consistent, avoiding errors in guiding and indicating the image caused by inconsistency.

Furthermore, the present invention adopts the predetermined physical optical mapping transform of the center of the visible light imaging module relative to the center of the near-infrared imaging module or the center of the display area of the display screen to overcome the errors in guiding and indicating the viewing angle and the gaze field of view of the eyes of the user when in use caused by inconsistency in physical positions of the center of the visible light imaging module relative to the center of the near-infrared imaging module or the center of the display area of the display screen.

Embodiment 2

Another embodiment 2 is provided according to another aspect of the present invention as a deformation and simplification of the foregoing Embodiment 1.

A human-machine interface system for guiding and indicating iris identification of a mobile terminal provided according to Embodiment 2 includes an iris identification near-infrared and visible light integrated imaging module having all-in-one function, a display screen, and a processor, where the iris identification near-infrared and visible light integrated imaging module having all-in-one function at least includes: a near-infrared and visible light optical imaging lens, a near-infrared and visible light optical filter, and an RGB-IR formatted image imaging sensor. For further explanation, the iris identification near-infrared and visible light integrated imaging module having all-in-one function has a function of physically imaging and outputting a near-infrared image and a visible light image synchronously.

Embodiment 2 of the present invention is used as the deformation and simplification of the foregoing Embodiment 1. Since the iris identification near-infrared and visible light integrated imaging module having all-in-one function adopts the common near-infrared and visible light optical imaging lens and the RGB-IR formatted image imaging sensor, it is equivalent to Embodiment 1, EFLnir=EFLvis, PSnir=PSvis, PXnir=PXvis, and PYnir=Pyvis, i.e., having the same optical imaging parameters and the same optical image acquisition area. Moreover, since the iris identification near-infrared and visible light integrated imaging module having all-in-one function adopts the common near-infrared and visible light optical imaging lens and the RGB-IR formatted image imaging sensor with the optical centers completely overlapping with each other, it is equivalent to Embodiment 1, Xnir=Xvis and Ynir=Yvis, so as to have the same optical center coordinate physical position.

Therefore, Embodiment 2, as the deformation and simplification of Embodiment 1, includes: the predetermined pixel adjustment is the predetermined physical optical mapping transform of the iris identification near-infrared and visible light integrated imaging module having all-in-one function relative to the center of the display area of the display screen, including a visible light image obtained by the center position pixel offset and local area ROI pixel selection processing of the relative imaging image.

The specific implementation process and details of Embodiment 2 are equivalent to those of Embodiment 1 under the equivalent condition that the iris identification near-infrared and visible light integrated imaging module having all-in-one function has the same near-infrared and visible light relative center and parameters.

The above-mentioned human-machine interface method for guiding and indicating iris identification of a mobile terminal based on Embodiment 1 is also applicable to the iris identification near-infrared and visible light integrated imaging module having all-in-one function of the above-mentioned Embodiment 2. The working steps of the human-machine interface method are the same as those of Embodiment 1, and details are not described herein again.

The content and technical features in the Detailed Description of the present invention can be implemented within the same or equivalent understanding range, such as parameter range change, and step equivalent device substitution and optical mapping equivalent transformation should also be equally understood.

Finally, it should also be noted that the above list is only a few specific embodiments of the present invention. It is apparent that the present invention is not limited to the above embodiments, and many variations are possible. All deformations that can be directly derived or referenced by those skilled in the art from the disclosure of the present invention should be considered to be the scope of protection of the present invention.

What is claimed is:

1. A human-machine interface system for guiding and indicating iris identification of a mobile terminal, including: an iris identification near-infrared imaging module, a visible light imaging module, a display screen and a processor, wherein:

an optical image acquisition area of the visible light imaging module covers an optical image acquisition area of the iris identification near-infrared imaging module;

the display screen displays a visible light image subjected to predetermined pixel adjustment, the image subjected to the predetermined pixel adjustment being a visible light image obtained by the center position pixel offset and/or local area ROI pixel selection processing of a relative imaging image; and the processor is connected to the iris identification near-infrared imaging module, the visible light imaging module, and the display screen for respectively acquiring and processing the near-infrared iris image and the visible light image, and feeding back and controlling the display screen for the guiding and indicating human-machine interface to display the visible light image;

wherein parameters of the iris identification near-infrared imaging module and the visible light imaging module are combined and configured as:

a product PSnir*PXnir of a unit pixel physical size PSnir of a near-infrared image imaging sensor of the iris identification near-infrared imaging module and the number of pixels PXnir in the X-axis horizontal direction is less than a product PSnir*PXnir of a unit pixel physical size PSvis of an image imaging sensor of the visible light imaging module and the number of pixels PXvis in the horizontal direction, i.e., PSnir*PXnir<PSvis*PXvis; or a product PSnir*PYnir of a unit pixel physical size PSnir of an image imaging sensor of the iris identification near-infrared imaging module and the number of pixels PYnir in the Y-axis vertical direction is less than a product PSvis*PYvis of a unit pixel physical size PSvis of an image imaging sensor of the visible light imaging module and the number of pixels PYvis in the vertical direction, i.e., PSnir*PYnir<PSvis*PYvis.

2. The human-machine interface system according to claim 1, wherein: the center position pixel offset processing of the relative imaging image specifically includes:

a center position pixel of a relative imaging image displayed in the display screen is subjected to X-Y coordinate axis shift pixel offset adjustment, the offset adjustment being determined according to the predetermined physical optical mapping of the center of the visible light imaging module relative to the center of the near-infrared imaging module and/or the center of the display area of the display screen.

3. The human-machine interface system according to claim 2, wherein: according to the physical optical mapping of the center of the visible light imaging module relative to the center of the near-infrared imaging module determined of the offset adjustment x-y axis displacement is calculated as follow:

$$X\_SHIFT = \beta vis*(Xnir-Xvis)/PSvis$$

$$\beta vis = EFLvis/(D-EFLvis)$$

where:
X_SHIFT, is X coordinate axis shifts of the center of the relative imaging image displayed in the display screen respectively, the unit is pixel;
Xnir is physical positions of the X coordinate axes of the optical center of the iris identification near-infrared imaging module respectively, the unit is cm;
Xvis is physical positions of the X coordinate axes of the optical center of the visible light imaging module respectively, the unit is cm;
βvis is the optical amplification factor of the visible light imaging module, no unit;
EFLvis is the equivalent focal length of the optical imaging lens of the visible light imaging module, the unit is mm;
D is the optical imaging object distance, the unit is cm; and
PSvis is the unit pixel physical size of the image imaging sensor of the visible light imaging module, the unit is μm/pixel.

4. The human-machine interface system according to claim 2, wherein: according to the physical optical mapping of the center of the visible light imaging module relative to the center of the near-infrared imaging module determined of the offset adjustment x-y axis displacement is calculated as follow:

$$Y\_SHIFT = \beta vis*(Ynir-Yvis)/PSvis$$

$$\beta vis = EFLvis/(D-EFLvis)$$

where:
Y_SHIFT is Y coordinate axis shifts of the center of the relative imaging image displayed in the display screen respectively, the unit is pixel;
Ynir is physical positions of the Y coordinate axes of the optical center of the iris identification near-infrared imaging module respectively, the unit is cm;
Yvis is physical positions of the Y coordinate axes of the optical center of the visible light imaging module respectively, the unit is cm;
βvis is the optical amplification factor of the visible light imaging module, no unit;
EFLvis is the equivalent focal length of the optical imaging lens of the visible light imaging module, the unit is mm;
D is the optical imaging object distance, the unit is cm; and
PSvis is the unit pixel physical size of the image imaging sensor of the visible light imaging module, the unit is μm/pixel.

5. The human-machine interface system according to claim 2, wherein: according to the physical optical mapping of the center of the visible light imaging module relative to the center of the display area of the display screen determined of the offset adjustment x-y axis displacement is calculated as follows:

$$X\_SHIFT = \beta vis*(Xdis-Xvis)/PSvis$$

$$\beta vis = EFLvis/(D-EFLvis)$$

where:
X_SHIFT is X coordinate axis shifts of the center of the relative imaging image displayed in the display screen respectively, the unit is pixel;
Xdis is physical positions of the X coordinate axes of the optical center of the display area 100 of the display screen respectively, the unit is cm;
Xvis is physical positions of the X coordinate axes of the optical center of the visible light imaging module respectively, the unit is cm;
where the ranges of the physical positions of the X and Y coordinate axes of the optical centers of the display area of the display screen and the visible light imaging module are as close as possible to optimize the effect;
βvis is the optical amplification factor of the visible light imaging module, no unit;
EFLvis is the equivalent focal length of the optical imaging lens of the visible light imaging module, the unit is mm;
D is the optical imaging object distance, the unit is cm; and
PSvis is the unit pixel physical size of the image imaging sensor of the visible light imaging module, the unit is μm/pixel.

6. The human-machine interface system according to claim 2, wherein: according to the physical optical mapping of the center of the visible light imaging module relative to the center of the display area of the display screen determined of the offset adjustment x-y axis displacement is calculated as follow:

$$Y\_SHIFT = \beta vis * (Ydis - Yvis)/PSvis$$

$$\beta vis = EFLvis/(D - EFLvis)$$

where:
Y_SHIFT is Y coordinate axis shifts of the center of the relative imaging image displayed in the display screen respectively, the unit is pixel;
Ydis is physical positions of the X and Y coordinate axes of the optical center of the display area of the display screen respectively, the unit is cm;
Yvis is physical positions of the X and Y coordinate axes of the optical center of the visible light imaging module respectively, the unit is cm;
where the ranges of the physical positions of the X and Y coordinate axes of the optical centers of the display area of the display screen and the visible light imaging module are as close as possible to optimize the effect;
βvis is the optical amplification factor of the visible light imaging module, no unit;
EFLvis is the equivalent focal length of the optical imaging lens of the visible light imaging module, the unit is mm;
D is the optical imaging object distance, the unit is cm; and
PSvis is the unit pixel physical size of the image imaging sensor of the visible light imaging module, the unit is μm/pixel.

7. The human-machine interface system according to claim 2, wherein: the displacement of the x-y axis is adjusted according to the bias determined by the predetermined physical optical mapping of the center of the visible light imaging module relative to the center of the near-infrared imaging module and the center of the display area adjusted the displacement of the x-y axis is mathematically equivalent to a combined transform of the physical optical mapping of the center of the visible light imaging module 102 relative to the center of the near-infrared imaging module 101 and the physical optical mapping of the center of the near-infrared imaging module 101 relative to the center of the display area 100 of the display screen.

8. The human-machine interface system according to claim 1, wherein: the local area ROI pixel selection processing of the relative imaging image specifically includes:
pixel selective adjustment of local area ROI of the relative imaging image displayed in the display screen is determined according to the physical optical mapping of the visible light imaging module relative to the center of the near-infrared imaging module and/or the center of the display area of the display screen.

9. The human-machine interface system according to claim 8, wherein: according to the physical optical mapping of the visible light imaging module relative to the center of the near-infrared imaging module determined of the selected local area quantity is calculated as follows:

$$X\_ROI = \beta vis * PSnir * PXnir/(\beta nir * PSvis)$$

$$\beta vis = EFLvis/(D - EFLvis)$$

$$\beta nir = EFLnir/(D - EFLnir)$$

where:
X_ROI is local area ROI of the relative imaging image displayed in the display screen respectively, the unit is pixel;
PXnir is the number of pixels in the X-axis horizontal direction of the iris identification near-infrared imaging module respectively, the unit is pixel;
βvis is the optical amplification factor of the visible light imaging module, no unit;
EFLnir is the equivalent focal length of the optical imaging lens of the iris identification near-infrared imaging module, the unit is mm;
EFLvis is the equivalent focal length of the optical imaging lens of the visible light imaging module, the unit is mm;
D is the imaging object distance, the unit is cm;
PSnir is the unit pixel physical size of the image imaging sensor of the iris identification near-infrared imaging module, the unit is μm/pixel; and
PSvis is the unit pixel physical size of the image imaging sensor of the visible light imaging module, the unit is μm/pixel.

10. The human-machine interface system according to claim 8, wherein: according to the physical optical mapping of the visible light imaging module relative to the center of the near-infrared imaging module determined of the selected local area quantity is calculated as follows:

$$Y\_ROI = \beta vis * PSnir * PYnir/(\beta nir * PSvis)$$

$$\beta vis = EFLvis/(D - EFLvis)$$

$$\beta nir = EFLnir/(D - EFLnir)$$

where:
Y_ROI is local area ROI of the relative imaging image displayed in the display screen respectively, the unit is pixel;
Pynir is the number of pixels in the Y-axis vertical direction of the iris identification near-infrared imaging module respectively, the unit is pixel;
βnir is the optical amplification factor of the iris identification near-infrared imaging module, no unit;
βvis is the optical amplification factor of the visible light imaging module, no unit;
EFLnir is the equivalent focal length of the optical imaging lens of the iris identification near-infrared imaging module, the unit is mm;
EFLvis is the equivalent focal length of the optical imaging lens of the visible light imaging module, the unit is mm;
D is the imaging object distance, the unit is cm;
PSnir is the unit pixel physical size of the image imaging sensor of the iris identification near-infrared imaging module, the unit is μm/pixel; and
PSvis is the unit pixel physical size of the image imaging sensor of the visible light imaging module, the unit is μm/pixel.

11. The human-machine interface system according to claim 8, wherein: according to the physical optical mapping of the visible light imaging module relative to the center of the display area of the display screen determined of the selected local area quantity is calculated as follows:

$$X\_ROI = \beta vis/PSvis * [(PSnir * PXnir/\beta nir) - abs(Xnir - Xdis)]$$

$$\beta vis = EFLvis/(D - EFLvis)$$

$$\beta nir = EFLnir/(D - EFLnir)$$

where:
X_ROI is local area ROI of the relative imaging image displayed in the display screen respectively, the unit is pixel;
PXnir is the number of pixels in the X-axis horizontal direction of the iris identification near-infrared imaging module respectively, the unit is pixel;
βnir is the optical amplification factor of the iris identification near-infrared imaging module, no unit;
βvis is the optical amplification factor of the visible light imaging module, no unit;
EFLnir is the equivalent focal length of the optical imaging lens of the iris identification near-infrared imaging module, the unit is mm;
EFLvis is the equivalent focal length of the optical imaging lens of the visible light imaging module, the unit is mm;
D is the imaging object distance, the unit is cm;
PSnir is the unit pixel physical size of the image imaging sensor of the iris identification near-infrared imaging module, the unit is μm/pixel;
PSvis is the unit pixel physical size of the image imaging sensor of the visible light imaging module, the unit is μm/pixel;
Xnir is physical positions of the X coordinate axes of the optical center of the iris identification near-infrared imaging module respectively, the unit is cm;
Xdis is physical positions of the X coordinate axes of the optical center of the display area of the display screen respectively, the unit is cm; and
abs( ) is an absolute value function for representing mathematical absolute value calculation.

12. The human-machine interface system according to claim 8, wherein: according to the physical optical mapping of the visible light imaging module relative to the center of the display area of the display screen determined of the selected local area quantity is calculated as follows:

$$Y\_ROI=\beta vis/PSvis*[(PSnir*PYnir/\beta nir)-abs(Ynir-Ydis)]$$

$$\beta vis=EFLvis/(D-EFLvis)$$

$$\beta nir=EFLnir/(D-EFLnir)$$

where:
Y_ROI is local area ROI of the relative imaging image displayed in the display screen respectively, the unit is pixel;
Pynir is the number of pixels in the Y-axis vertical direction of the iris identification near-infrared imaging module respectively, the unit is pixel;
βnir is the optical amplification factor of the iris identification near-infrared imaging module, no unit;
βvis is the optical amplification factor of the visible light imaging module, no unit;
EFLnir is the equivalent focal length of the optical imaging lens of the iris identification near-infrared imaging module, the unit is mm;
EFLvis is the equivalent focal length of the optical imaging lens of the visible light imaging module, the unit is mm;
D is the imaging object distance, the unit is cm;
PSnir is the unit pixel physical size of the image imaging sensor of the iris identification near-infrared imaging module, the unit is μm/pixel;
PSvis is the unit pixel physical size of the image imaging sensor of the visible light imaging module, the unit is μm/pixel;
Ynir is physical positions of the Y coordinate axes of the optical center of the iris identification near-infrared imaging module respectively, the unit is cm;
Ydis is physical positions of the Y coordinate axes of the optical center of the display area of the display screen respectively, the unit is cm; and
abs( ) is an absolute value function for representing mathematical absolute value calculation.

13. The human-machine interface system according to claim 6, wherein: the displacement of the x-y axis is adjusted according to the bias determined by the predetermined physical optical mapping of the center of the visible light imaging module relative to the center of the near-infrared imaging module and the center of the display area adjusted the select local area is mathematically equivalent to a combined transform of the physical optical mapping of the center of the visible light imaging module 102 relative to the center of the near-infrared imaging module 101 and the physical optical mapping of the center of the near-infrared imaging module 101 relative to the center of the display area 100 of the display screen.

14. The human-machine interface system according to claim 1, wherein: the optical image acquisition region of the visible light imaging module is larger than that of the near-infrared imaging module.

15. A human-machine interface method for guiding and indicating iris identification of a mobile terminal, the mobile terminal includes an iris identification near-infrared imaging module, a visible light imaging module, a display screen, and a processor chip, wherein the processor is connected to the iris identification near-infrared imaging module, the visible light imaging module, and the display screen for respectively acquiring and processing the near-infrared iris image and the visible light image, and feeding back and controlling the display screen for the guiding and indicating human-machine interface to display the visible light image, the method includes the following steps:

a) acquiring and physically imaging and outputting a near-infrared iris image;
b) acquiring and physically imaging and outputting a visible light iris image;
c) displaying the visible light iris image subjected to predetermined pixel adjustment by the display screen, the predetermined pixel is adjusted to undergo pixel offset and/or local area ROI pixel selection process relative to the central position of the image;
wherein parameters of the iris identification near-infrared imaging module and the visible light imaging module are combined and configured as:
a product PSnir*PXnir of a unit pixel physical size PSnir of a near-infrared image imaging sensor of the iris identification near-infrared imaging module and the number of pixels PXnir in the X-axis horizontal direction is less than a product PSnir*PXnir of a unit pixel physical size PSvis of an image imaging sensor of the visible light imaging module and the number of pixels PXvis in the horizontal direction, i.e., PSnir*PXnir<PSvis*PXvis; or
a product PSnir*PYnir of a unit pixel physical size PSnir of an image imaging sensor of the iris identification near-infrared imaging module and the number of pixels PYnir in the Y-axis vertical direction is less than a product PSvis*PYvis of a unit pixel physical size PSvis of an image imaging sensor of the visible light imaging module and the number of pixels PYvis in the vertical direction, i.e., PSnir*PYnir<PSvis*PYvis.

16. The human-machine interface method according to claim 15, wherein: the center position pixel offset processing of the relative imaging image specifically includes:

a center position pixel of a relative imaging image displayed is subjected to X-Y coordinate axis shift pixel offset adjustment, the offset adjustment being determined according to the pre-determined physical optical mapping of the center of the visible light imaging module relative to the center of the near-infrared imaging module and/or the center of the display area of the display screen.

17. The human-machine interface method according to claim 16, wherein: according to the physical optical mapping of the center of the visible light imaging module relative to the center of the near-infrared imaging module determined of the offset adjustment x-y axis displacement is calculated as follow:

$$X\_SHIFT=\beta vis*(Xnir-Xvis)/PSvis$$

$$\beta vis=EFLvis/(D-EFLvis)$$

where:
X_SHIFT is X coordinate axis shifts of the center of the relative imaging image displayed in the display screen respectively, the unit is pixel;
Xnir is physical positions of the X coordinate axes of the optical center of the iris identification near-infrared imaging module respectively, the unit is cm;
Xvis is physical positions of the X coordinate axes of the optical center of the visible light imaging module respectively, the unit is cm;
βvis is the optical amplification factor of the visible light imaging module, no unit;
EFLvis is the equivalent focal length of the optical imaging lens of the visible light imaging module, the unit is mm;
D is the optical imaging object distance, the unit is cm; and
PSvis is the unit pixel physical size of the image imaging sensor of the visible light imaging module, the unit is μm/pixel.

18. The human-machine interface method according to claim 16, wherein: according to the physical optical mapping of the center of the visible light imaging module relative to the center of the near-infrared imaging module determined of the offset adjustment x-y axis displacement is calculated as follow:

$$Y\_SHIFT=\beta vis*(Ynir-Yvis)/PSvis$$

$$\beta vis=EFLvis/(D-EFLvis)$$

where:
Y_SHIFT is Y coordinate axis shifts of the center of the relative imaging image displayed in the display screen respectively, the unit is pixel;
Ynir is physical positions of the Y coordinate axes of the optical center of the iris identification near-infrared imaging module respectively, the unit is cm;
Yvis is physical positions of the Y coordinate axes of the optical center of the visible light imaging module respectively, the unit is cm;
βvis is the optical amplification factor of the visible light imaging module, no unit;
EFLvis is the equivalent focal length of the optical imaging lens of the visible light imaging module, the unit is mm;
D is the optical imaging object distance, the unit is cm; and
PSvis is the unit pixel physical size of the image imaging sensor of the visible light imaging module, the unit is μm/pixel.

19. The human-machine interface method according to claim 16, wherein: according to the physical optical mapping of the center of the visible light imaging module relative to the center of the display area of the display screen determined of the offset adjustment x-y axis displacement is calculated as follows:

$$X\_SHIFT=\beta vis*(Xdis-Xvis)/PSvis$$

$$\beta vis=EFLvis/(D-EFLvis)$$

where:
X_SHIFT is X coordinate axis shifts of the center of the relative imaging image displayed in the display screen respectively, the unit is pixel;
Xdis is physical positions of the X coordinate axes of the optical center of the display area 100 of the display screen respectively, the unit is cm;
Xvis is physical positions of the X coordinate axes of the optical center of the visible light imaging module respectively, the unit is cm;
where the ranges of the physical positions of the X and Y coordinate axes of the optical centers of the display area of the display screen and the visible light imaging module are as close as possible to optimize the effect;
βvis is the optical amplification factor of the visible light imaging module, no unit;
EFLvis is the equivalent focal length of the optical imaging lens of the visible light imaging module, the unit is mm;
D is the optical imaging object distance, the unit is cm; and
PSvis is the unit pixel physical size of the image imaging sensor of the visible light imaging module, the unit is μm/pixel.

20. The human-machine interface method according to claim 16, wherein: according to the physical optical mapping of the center of the visible light imaging module relative to the center of the display area of the display screen determined of the offset adjustment x-y axis displacement is calculated as follow:

$$Y\_SHIFT=\beta vis*(Ydis-Yvis)/PSvis$$

$$\beta vis=EFLvis/(D-EFLvis)$$

where:
Y_SHIFT is Y coordinate axis shifts of the center of the relative imaging image displayed in the display screen respectively, the unit is pixel;
Ydis is physical positions of the X and Y coordinate axes of the optical center of the display area of the display screen respectively, the unit is cm;
Yvis is physical positions of the X and Y coordinate axes of the optical center of the visible light imaging module respectively, the unit is cm;
where the ranges of the physical positions of the X and Y coordinate axes of the optical centers of the display area of the display screen and the visible light imaging module are as close as possible to optimize the effect;
βvis is the optical amplification factor of the visible light imaging module, no unit;
EFLvis is the equivalent focal length of the optical imaging lens of the visible light imaging module, the unit is mm;

D is the optical imaging object distance, the unit is cm; and

PSvis is the unit pixel physical size of the image imaging sensor of the visible light imaging module, the unit is μm/pixel.

21. The human-machine interface method according to claim 16, wherein: the displacement of the x-y axis is adjusted according to the bias determined by the predetermined physical optical mapping of the center of the visible light imaging module relative to the center of the near-infrared imaging module and the center of the display area adjusted the displacement of the x-y axis is mathematically equivalent to a combined transform of the physical optical mapping of the center of the visible light imaging module 102 relative to the center of the near-infrared imaging module 101 and the physical optical mapping of the center of the near-infrared imaging module 101 relative to the center of the display area 100 of the display screen.

22. The human-machine interface method according to claim 16, wherein: the local area ROI pixel selection processing of the relative imaging image specifically includes:
pixel selective adjustment of local area ROI of the relative imaging image displayed is determined according to the physical optical mapping of the visible light imaging module relative to the center of the near-infrared imaging module and/or the center of the display area of the display screen.

23. The human-machine interface method according to claim 22, wherein: according to the physical optical mapping of the visible light imaging module relative to the center of the near-infrared imaging module determined of the selected local area quantity is calculated as follows:

$$X\_ROI = \beta vis * PSnir * PXnir / (\beta nir * PSvis)$$

$$\beta vis = EFLvis / (D - EFLvis)$$

$$\beta nir = EFLnir / (D - EFLnir)$$

where:

X_ROI is local area ROI of the relative imaging image displayed in the display screen respectively, the unit is pixel;

PXnir is the number of pixels in the X-axis horizontal direction of the iris identification near-infrared imaging module respectively, the unit is pixel;

βvis is the optical amplification factor of the visible light imaging module, no unit;

EFLnir is the equivalent focal length of the optical imaging lens of the iris identification near-infrared imaging module, the unit is mm;

EFLvis is the equivalent focal length of the optical imaging lens of the visible light imaging module, the unit is mm;

D is the imaging object distance, the unit is cm;

PSnir is the unit pixel physical size of the image imaging sensor of the iris identification near-infrared imaging module, the unit is μm/pixel; and PSvis is the unit pixel physical size of the image imaging sensor of the visible light imaging module, the unit is μm/pixel.

24. The human-machine interface method according to claim 22, wherein: according to the physical optical mapping of the visible light imaging module relative to the center of the near-infrared imaging module determined of the selected local area quantity is calculated as follows:

$$Y\_ROI = \beta vis * PSnir * PYnir / (\beta nir * PSvis)$$

$$\beta vis = EFLvis / (D - EFLvis)$$

$$\beta nir = EFLnir / (D - EFLnir)$$

where:

Y_ROI is local area ROI of the relative imaging image displayed in the display screen respectively, the unit is pixel;

Pynir is the number of pixels in the Y-axis vertical direction of the iris identification near-infrared imaging module respectively, the unit is pixel;

βnir is the optical amplification factor of the iris identification near-infrared imaging module, no unit;

βvis is the optical amplification factor of the visible light imaging module, no unit;

EFLnir is the equivalent focal length of the optical imaging lens of the iris identification near-infrared imaging module, the unit is mm;

EFLvis is the equivalent focal length of the optical imaging lens of the visible light imaging module, the unit is mm;

D is the imaging object distance, the unit is cm;

PSnir is the unit pixel physical size of the image imaging sensor of the iris identification near-infrared imaging module, the unit is μm/pixel; and PSvis is the unit pixel physical size of the image imaging sensor of the visible light imaging module, the unit is μm/pixel.

25. The human-machine interface method according to claim 22, wherein: according to the physical optical mapping of the visible light imaging module relative to the center of the display area of the display screen determined of the selected local area quantity is calculated as follows:

$$X\_ROI = \beta vis / PSvis * [(PSnir * PXnir / \beta nir) - abs(Xnir - Xdis)]$$

$$\beta vis = EFLvis / (D - EFLvis)$$

$$\beta nir = EFLnir / (D - EFLnir)$$

where:

X_ROI is local area ROI of the relative imaging image displayed in the display screen respectively, the unit is pixel;

PXnir is the number of pixels in the X-axis horizontal direction of the iris identification near-infrared imaging module respectively, the unit is pixel;

βnir is the optical amplification factor of the iris identification near-infrared imaging module, no unit;

βvis is the optical amplification factor of the visible light imaging module, no unit;

EFLnir is the equivalent focal length of the optical imaging lens of the iris identification near-infrared imaging module, the unit is mm;

EFLvis is the equivalent focal length of the optical imaging lens of the visible light imaging module, the unit is mm;

D is the imaging object distance, the unit is cm;

PSnir is the unit pixel physical size of the image imaging sensor of the iris identification near-infrared imaging module, the unit is μm/pixel;

PSvis is the unit pixel physical size of the image imaging sensor of the visible light imaging module, the unit is μm/pixel;

Xnir is physical positions of the X coordinate axes of the optical center of the iris identification near-infrared imaging module respectively, the unit is cm;

Xdis is physical positions of the X coordinate axes of the optical center of the display area of the display screen respectively, the unit is cm; and abs( ) is an absolute value function for representing mathematical absolute value calculation.

26. The human-machine interface method according to claim 22, wherein:

according to the physical optical mapping of the visible light imaging module relative to the center of the display area of the display screen determined of the selected local area quantity is calculated as follows:

$$Y\_ROI = \beta vis/PSvis * [(PSnir * PYnir/\beta nir) - abs(Ynir - Ydis)]$$

$$\beta vis = EFLvis/(D - EFLvis)$$

$$\beta nir = EFLnir/(D - EFLnir)$$

where:

Y_ROI is local area ROI of the relative imaging image displayed in the display screen respectively, the unit is pixel;

Pynir is the number of pixels in the Y-axis vertical direction of the iris identification near-infrared imaging module respectively, the unit is pixel;

$\beta nir$ is the optical amplification factor of the iris identification near-infrared imaging module, no unit;

$\beta vis$ is the optical amplification factor of the visible light imaging module, no unit;

EFLnir is the equivalent focal length of the optical imaging lens of the iris identification near-infrared imaging module, the unit is mm;

EFLvis is the equivalent focal length of the optical imaging lens of the visible light imaging module, the unit is mm;

D is the imaging object distance, the unit is cm;

PSnir is the unit pixel physical size of the image imaging sensor of the iris identification near-infrared imaging module, the unit is μm/pixel;

PSvis is the unit pixel physical size of the image imaging sensor of the visible light imaging module, the unit is μm/pixel;

Ynir is physical positions of the Y coordinate axes of the optical center of the iris identification near-infrared imaging module respectively, the unit is cm;

Ydis is physical positions of the Y coordinate axes of the optical center of the display area of the display screen respectively, the unit is cm; and abs( ) is an absolute value function for representing mathematical absolute value calculation.

27. The human-machine interface method according to claim 22, wherein: the displacement of the x-y axis is adjusted according to the bias determined by the predetermined physical optical mapping of the center of the visible light imaging module relative to the center of the near-infrared imaging module and the center of the display area adjusted the select local area is mathematically equivalent to a combined transform of the physical optical mapping of the center of the visible light imaging module 102 relative to the center of the near-infrared imaging module 101 and the physical optical mapping of the center of the near-infrared imaging module 101 relative to the center of the display area 100 of the display screen.

28. The human-machine interface method according to claim 15, wherein: the optical image acquisition region of the visible light imaging module is larger than that of the near-infrared imaging module.

* * * * *